Dec. 5, 1950 G. J. HOUSTON 2,532,916
RATTRAP
Filed Jan. 23, 1947

INVENTOR.
GEORGE J. HOUSTON, SR.
BY Victor J. Evans & Co.
ATTORNEYS

Patented Dec. 5, 1950

2,532,916

UNITED STATES PATENT OFFICE 2,532,916

RATTRAP

George J. Houston, Scranton, Pa.

Application January 23, 1947, Serial No. 723,711

4 Claims. (Cl. 43—81)

This invention relates to improvements in animal traps, and more particularly to the provision of a novel type of rat trap.

It is an object of the invention to provide in a rat trap a tripping device which quickly releases a spring controlled member when a rat or mouse touches bait in the trap.

A further object is the provision of a tripping device which is simple and easily constructed, the device being adapted to be applied to standard types of rat traps.

A further object is to provide a tripping device for rat traps which can be adjusted to regulate the sensitivity thereof.

These and other objects are attained by the novel construction and arrangement of parts hereinafter described and illustrated by the accompanying drawings, forming a part hereof, and in which.

Figure 1:
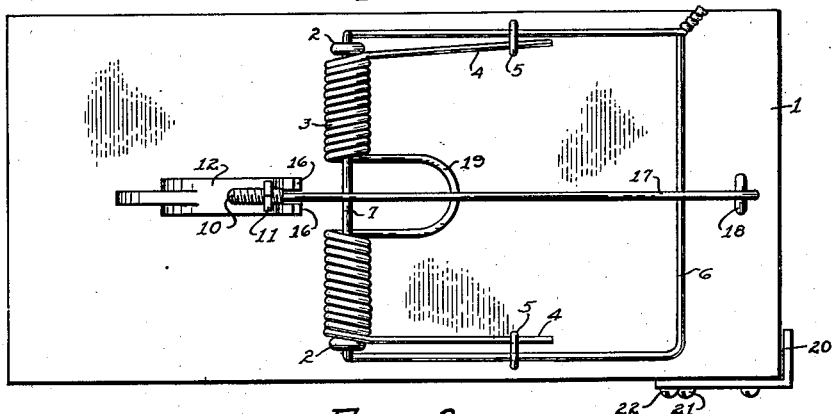
Fig. 1 is a plan view of a rat trap embodying the invention in set position.

Referring to the drawings, the rat trap is shown to comprise a base 1, preferably made of wood or the like, and having secured thereto the legs 2 of a coiled spring 3 of a type generally used in rat traps. The spring 3 has arms 4 which pass through loops in a wire member 6, the loops being designated by the numeral 5. The wire member 6, which is rectangular is formed of a single piece of wire, with a side passing through the spring 3, and the ends of the wire wound together as shown at 8.

A threaded bolt 9 passes through the base 1 and has its upper end bent as shown at 10, and receiving a threaded nut 11. A bait holder 12 has a threaded aperture 13 by means of which the holder can be freely rotatably mounted on the bolt 9. The holder 12 has an outwardly projecting hook 14 and two hooks 15 on the sides thereof to hold bait. At the opposite end, the holder has a pair of spaced prongs 16 which act as a guide for trigger rod 17, which is held by a loop 18 in a well known manner.

Figure 2:
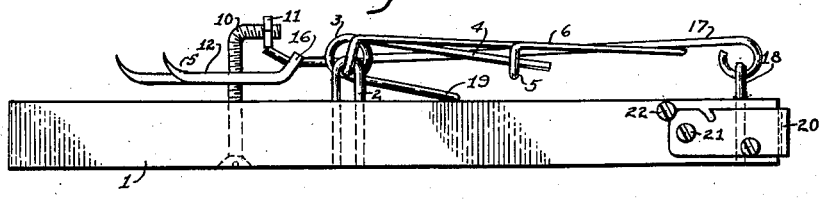
Fig. 2 is a side view of the trap in Figure 1.
Figure 3:
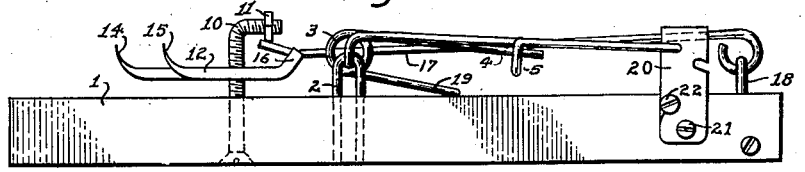
Fig. 3 is a side view of the trap with the clip in position for the setting of the trap.
Figure 4:
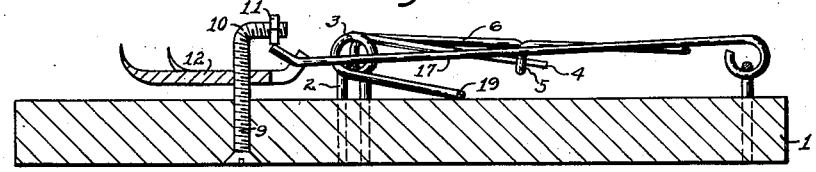
Fig. 4 is a sectional view on the line 4—4 of Figure 1.
Figure 5:
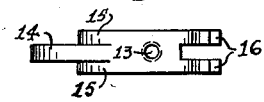
Fig. 5 is a plan view of the bait holder.

The spring has a loop 19 as is usual with such springs, and at the end of the base 1 is a clip 20 pivoted at 21 and having a recess 22 in which a screw 21 is adapted to fit. The clip 20 is designed to hold the wire member 6 while the trigger rod 17 is being adjusted under the nut 11. After which the clip is returned to the position shown in Fig. 2.

In operation, the bait is placed on the hooks 14 and 15, and the nut 11 adjusted. The trigger rod 17 is inserted under the nut and the clip returned to the position shown in Fig. 2. When a rat or mouse touches the bait the holder 12 moves freely about the bolt 9. This will cause the trigger rod 17 to move either to the right or left. The nut 11 will then move freely in either direction until the upward pressure of the rod 17 will cause the nut to move to a position where the rod will more rapidly move the nut from engagement with the trigger rod 17, and thus releasing the wire member 6, the latter being thrown violently upon the rodent by the spring 3.

It will be seen that there has been provided a simple and effective rat trap, in which is included a quick acting tripping device associated with a bait holder. The device is of simple structure and can be easily adjusted and manipulated.

The above description is to be considered as illustrative and not limitative of the invention of which modifications can be made without departing from the scope and spirit as set forth in the appended claims.

The invention having been described, what is claimed is:

1. In a rat trap, a base, a bolt passing through the base and having its upper end bent at right angles and threaded, a nut threaded on the bolt upper end, a bait holder threadedly mounted on the bolt, said holder having bait receiving hooks, a spring controlled wire member, a trigger rod adapted to engage the nut to hold the wire member in a cocked position, and a clip to hold the wire member while the trigger rod is being adjusted.

2. In a rat trap, a base, a bolt held by the base and having its upper end bent at right angles and threaded, a nut on the upper end, a bait holder having an aperture through which the bolt passes, said holder being threaded on the bolt, a spring controlled wire member and a trigger rod pivotally mounted on the base, said rod having one end adapted to engage the nut.

3. The structure set forth in claim 2 further characterized by the bait holder having at one end upturned hooks to receive bait and at its other end upturned spaced prongs to act as a guide for the trigger rod.

4. The structure set forth in claim 2, wherein said spring controlled wire member is held by the trigger rod, and a pivotally mounted clip is provided to hold the wire member in position while the trigger rod is being adjusted.

GEORGE J. HOUSTON.

REFERENCES CITED

The following references are of record in the file of this patent:

UNITED STATES PATENTS

| Number | Name | Date |
|---|---|---|
| 1,665,951 | Ebel | Apr. 10, 1928 |
| 1,897,151 | Seghers | Feb. 14, 1933 |